US005315975A

United States Patent [19]

Hattori et al.

[11] Patent Number: 5,315,975

[45] Date of Patent: May 31, 1994

[54] INTAKE CONTROL DEVICE FOR INTERNAL COMBUSTION ENGINE

[75] Inventors: Yasuhiko Hattori; Kenji Eitoku, both of Oobu, Japan

[73] Assignee: Aisan Kogyo Kabushiki Kaisha, Aichi, Japan

[21] Appl. No.: 43,032

[22] Filed: Apr. 5, 1993

[30] Foreign Application Priority Data

Apr. 20, 1992 [JP] Japan ................................ 4-125355

[51] Int. Cl.[5] ........................... F02D 9/08; F16K 1/22

[52] U.S. Cl. .................................... 123/337; 123/403; 251/305

[58] Field of Search ................ 123/337, 403; 251/304, 251/305

[56] References Cited

U.S. PATENT DOCUMENTS

| | | | |
|---|---|---|---|
| 1,230,337 | 6/1917 | Stoffel | 123/403 |
| 4,308,837 | 1/1982 | Nohira et al. | 123/337 |
| 4,391,247 | 7/1983 | Shioyama et al. | 123/403 |
| 4,462,358 | 7/1984 | Ishida et al. | 123/337 |
| 4,474,150 | 10/1984 | Foley et al. | 123/337 |
| 4,572,478 | 2/1986 | Vogler et al. | 251/305 |
| 4,967,778 | 11/1990 | Ball et al. | 251/305 |

FOREIGN PATENT DOCUMENTS

| | | | |
|---|---|---|---|
| 18631 | 1/1991 | Japan | 123/337 |

*Primary Examiner*—E. Rollins Cross
*Assistant Examiner*—Thomas N. Moulis
*Attorney, Agent, or Firm*—Koda and Androlia

[57] ABSTRACT

An intake control device for an internal combustion engine having a body member 1 and a throttle valve 5 disposed within an air passage 4. The external circular edge of the throttle valve 5 is divided, with a throttle shaft 6 into a first edge portion **5*a* which moves toward the upstream side of the air passage 4 and a second edge portion 5*b* which moves toward the downstream side of the air passage 4. On an inner wall 7 of the air passage 4 of the body member 1 are formed an upstream-side spherical wall surface 8 in a position facing the first edge portion 5*a* and a downstream-side spherical wall surface 9 in a position facing the second edge portion 5*b*. A first clearance 13 formed between the first edge portion 5*a* and the upstream-side spherical wall surface 8 is smaller than a second clearance 14 formed between the second edge portion 5*b* and the downstream-side spherical wall surface; the second edge portion 5*b* of the throttle valve 5 may not come into contact with the downstream-side spherical wall surface 9 even when a high intake manifold vacuum is built on the downstream side of the throttle valve 5 when the throttle valve 5 is in a position for closing the air passage 4**.

4 Claims, 3 Drawing Sheets

INTAKE CONTROL DEVICE FOR INTERNAL COMBUSTION ENGINE

BACKGROUND OF THE INVENTION

1. Field of the Invention

The present invention relates to an intake control device mounted in an intake air passage of an internal combustion engine, for controlling the quantity of air to be supplied into combustion chambers of the internal combustion engine by a throttle valve.

2. Description of the Prior Art

It is known in the art that in an intake control device for use in an internal combustion engine provided with a fuel injection system, a throttle body is connected to the upstream side of an intake manifold of the internal combustion engine in which a spherical wall surface is formed in an inner wall of the air passage of the throttle body at a position facing to the external circular edge portion of the throttle valve for controlling the effective surface area of the air passage, for the purpose of stabilizing the operation of the internal combustion engine within a range of low rotational speeds of the engine.

The throttle body shown in FIG. 3 has been disclosed in Japanese Patent Application Laid-Open Gazette No. 15631/1991, in which a body member 1 of the throttle body is formed in a cylindrical shape provided with an air inlet 2 on the upstream side and an air outlet 3 on the downstream side connected to an intake manifold (not illustrated); an air passage 4 is formed inside of the body member 1 to connect the air inlet 2 to the air outlet 3; and disk-like throttle valve 5 is positioned in the air passage 4 and rotatably supported to the body member 1 by a throttle shaft 6.

The throttle valve 5 is rotated, in accordance with the operation of an accelerator pedal (not illustrated), between a first position indicated by a solid line in FIG. 3, that is, a closed position of the air passage 4, and a second position indicated by a dashed line, that is, a wide-opened position of the air passage 4. The outer peripheral edge of the throttle valve 5 is divided by the throttle shaft 6 as a boundary into a first external circular edge portion 5*a* which moves toward the upstream side of the air passage 4 and a second external circular edge portion 5*b* which moves toward the downstream side when the throttle valve 5 rotates from the first position toward the second position.

When the throttle valve 5 is in the first position, the first external circular edge portion 5*a* and the second external circular edge portion 5*b* of the throttle valve 5 are located at positions almost in contact with an inner wall 7 which defines the air passage 4 of the body member 1, respectively. The inner wall 7 of the body member 1 is provided with an upstream-side spherical wall surface 8 which is formed protrusively into the air passage 4 on the upstream side from a portion of the inner wall 7 facing to the first external circular edge portion 5*a*, and also a downstream-side spherical wall surface 9 which is formed protrusively into the air passage 4 on the downstream side from a portion of the inner wall 7 facing to the second external circular edge portion 5*b*. The upstream-side spherical wall surface 8 and the downstream-side spherical wall surface 9 terminate in positions where the throttle valve 5 has rotated by a predetermined angle from the first position, respectively. The upstream-side spherical wall surface 8 and the downstream-side spherical wall surface 9 are formed in such spherical surfaces that, clearances between the spherical wall portions 8 and 9 and the first and the second external circular edge portions 5*a* and 5*b* of the throttle valve 5 increase with an increase in the angle of counterclockwise rotation of the throttle valve 5 from the first position, as indicated by a dot-dash-line in FIG. 3. Accordingly, a rate of increment in the quantity of air to be supplied into the intake manifold of the internal combustion engine remains small during the movement of the external circular edge portions 5*a* and 5*b* of the throttle valve 5 along the spherical wall surfaces 8 and 9; when the external circular edge portions 5*a* and 5*b* of the throttle valve 5 have moved as far as a position off from the spherical wall surfaces 8 and 9, the rate of increment in the quantity of air supplied into the intake manifold of the internal combustion engine becomes large. In the low-speed and medium-speed ranges of the internal combustion engine, therefore, a slight variation in the angle of rotation of the throttle valve 5 stabilizes engine operation without causing a variation over a target value in the rate of increment in the quantity of air supplied into the intake manifold. In the high speed range, the rate of increment in the quantity of air supplied into the intake manifold can be made high as compared with the rate of increment in the angle of rotation of the throttle valve 5.

When the throttle valve 5 is moved back to, or near to, the first position, with the accelerator pedal released or loosened, during the operation of the internal combustion engine in a high-speed range, the vacuum in the intake manifold, that is, the intake manifold vacuum, increases and accordingly the throttle valve 5 is pulled toward the air outlet 3 located on the downstream side, resulting, at this time, in deflection of the throttle shaft 6 and looseness of the pedestal supporting the throttle shaft 6 to the body member 1. Thus the throttle valve 5 moves toward the air outlet 3 on the downstream side, sometimes causing the second external circular edge portion 5*b* of the throttle valve 5 to contact the downstream-side spherical wall surface 9. If this contact occurred, there would occur resistance with the rotation of the throttle valve 5 in the direction in which the quantity of air flowing in the air passage 4 increases, disturbing smooth operation of the internal combustion engine.

SUMMARY OF THE INVENTION

It is a primary object of the present invention to provide an intake control device for an internal combustion engine having the above-described upstream-side spherical wall surface and downstream-side spherical wall surface formed in the inside wall defining an air passage thereof, which assure smooth rotation of a throttle valve even when a high vacuum has been built in the air outlet side on the downstream side.

It is another object of the present invention to provide an intake control device for an internal combustion engine stated above, in which an external circular edge portion of the throttle valve will not come in contact with the downstream-side spherical wall surface facing to the throttle valve when a high vacuum has been built in the air outlet side on the downstream side.

Generally speaking, the present invention is related to an intake control device for an internal combustion engine, comprising a body member which is provided with an air inlet opening on an upstream side and an air outlet opening on a downstream side, and is formed in a cylindrical form having an air passage therein for connecting the air inlet opening with the air outlet opening; a plate-like throttle valve which is disposed within the air passage, supported rotatably by a throttle shaft to the body member, and is rotatable between a first position where the air passage is fully closed and a second position where the air passage is fully opened. The throttle valve is provided with a first external circular edge portion which is moved toward the upstream side from the first position and a second external circular edge portion which is moved toward the downstream side from the first position. A couple of spherical wall surfaces including an upstream-side spherical wall surface and a downstream-side spherical wall surface are protrusively formed on an inner wall surface which defines the air passage of the body member. The upstream-side spherical wall surface is formed in a position where the first external circular edge portion faces during the rotation of the throttle valve within a range of a predetermined angle from the first position, and the downstream-side spherical wall surface is formed in a position where the second external circular edge portion faces during the rotation of the throttle valve within the range of the predetermined angle from the first position.

According to the present invention, it is provided an intake control device for an internal combustion engine, in which the upstream-side spherical wall surface and the downstream-side spherical wall surface are formed in such spherical surfaces that a first clearance provided between the upstream-side spherical wall surface and the first external circular edge portion of the throttle valve and a second clearance provided between the downstream-side peripheral wall surface and the external circular edge portion of the throttle valve increase with an increase in the angle of rotation of the throttle valve rotating from the first position toward the second position; the second clearance is larger than the first clearance at least in the vicinity of the first position of the throttle valve.

Further, according to the present invention, it is provided an intake control device for an internal combustion engine, in which a central axis of rotation of the throttle shaft is intersecting a central axis of the air passage provided in the body member; the upstream-side spherical wall surface is formed in a spherical surface having its center at a point off on the upstream side above the central axis of rotation of the throttle shaft on the central axis of the air passage; and the downstream-side spherical wall surface is formed in a spherical surface having its center at a point off on the downstream side below the central axis of rotation of the throttle shaft on the central axis of the air passage.

According to the present invention, the second clearance is made larger than the first clearance stated above when the throttle valve is in a position corresponding to the low-speed or medium-speed range of the internal combustion engine; therefore the second external circular edge portion of the throttle valve may not contact the downstream-side spherical wall surface, even if there is built a high vacuum on the downstream side of the throttle valve, thus assuring smooth rotation of the throttle valve.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DESCRIPTION OF THE PREFERRED EMBODIMENT

Figure 1:
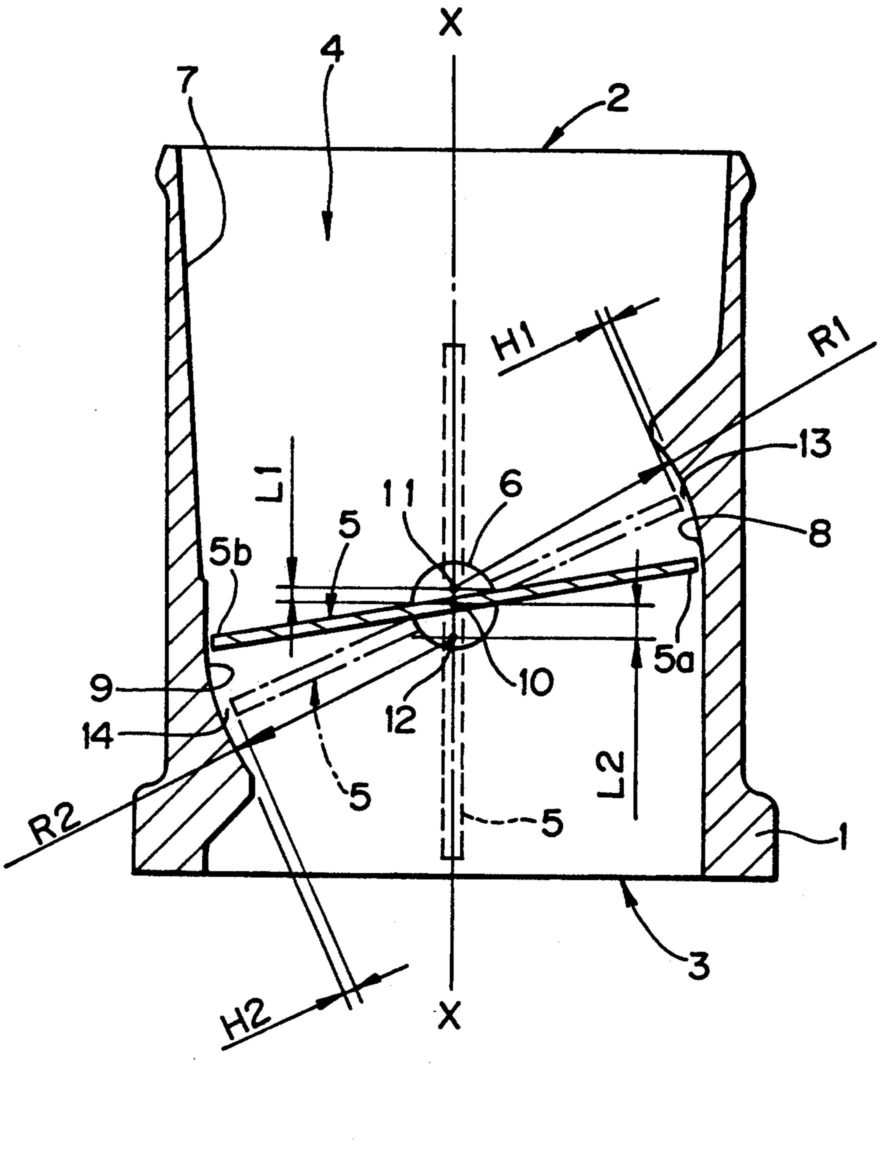
FIG. 1 is a sectional view of one embodiment of an intake control device according to the present invention.

FIG. 1 shows one embodiment of an intake control device for an internal combustion engine according to the present invention, and particularly a throttle body used in the internal combustion engine provided with a fuel injection system similar to the prior art stated above. In FIG. 1, an upstream-side spherical wall surface and a downstream-side spherical wall surface are shown merely in section for purpose of explaining the formation of the clearance between the upstream-side and downstream-side spherical wall surfaces and a throttle valve.

In FIG. 1, the throttle body is provided with the throttle valve 5 formed in a circular plate and a cylindrical body member 1. The body member 1 has an air inlet 2 open on the upstream side of the throttle valve 5 and an air outlet 3 open on the downstream side of the throttle valve 5; in the body member 1 is formed an air passage 4 which is defined by a cylindrical inner wall 7 having in principle a central axis X—X connecting the air inlet 2 to the air outlet 3. The throttle valve 5 is located within the air passage 4, and rotatably supported on the body member 1 by means of a throttle shaft 6 fixed in a position on one diameter thereof.

The throttle valve 5 is designed to rotate between the first position indicated by a solid line in FIG. 1, that is, the position in which the air passage 4 is closed, and the second position indicated by a dashed line, that is, the position in which the air passage 4 is fully opened in accordance with the operation of an accelerator pedal (not illustrated) when it is depressed by a driver. When the driver has released the accelerator pedal, the throttle valve 5 is held in the first position by means of the force of a return spring and a stopper (not illustrated) provided on the throttle shaft 6. The outer peripheral edge of the throttle valve 5 is divided by the throttle shaft 6 as a boundary into a first external circular edge portion **5*a* which moves toward the upstream side of the air passage 4 and a second external circular edge portion 5*b* which moves toward the downstream side of the air passage 4**.

On the inner wall 7 which defines the air passage 4 of the body member 1, the upstream-side spherical wall surface 8 is formed on the upstream side of a position where the first external circular edge portion **5*a* of the throttle valve 5 faces in the radial direction thereof when the throttle valve 5 is positioned in said first position, and the downstream-side spherical wall surface 9 is formed on the downstream-side of a position where the second external circular edge portion 5*b* of the throttle valve 5 faces in the radial direction when the throttle valve 5 is positioned in said first position. Both spherical wall surfaces 8 and 9 protrude into the air passage 4. The upstream-side spherical wall surface 8 and the downstream-side spherical wall surface 9 terminate in positions to which the throttle valve 5 has rotated from the first position through a predetermined angle. Furthermore, the upstream-side spherical wall surface 8 and the downstream-side spherical wall surface 9 are formed only in positions corresponding to the positions where the throttle valve 5 accomplishes the low-speed and medium-speed ranges of the internal combustion engine. The upstream-side spherical wall surface 8 is formed in such spherical surface that a slight spacing is present between this wall surface 8 and the first external circular edge portion 5***a* of the throttle valve 5 in the radial direction thereof when the throttle valve 5 is in the first position, and the clearance increases, with an increase in the angle of rotation of the throttle valve 5 from the first position, when the throttle valve 5 is rotated in a counterclockwise direction as indicated by a dot-and-dash line in FIG. 1. The downstream-side spherical wall surface 9 also is formed in such spherical surface that a slight clearance is present between the wall surface 9 and the second external circular edge portion 5*b* of the throttle valve 5 in the radial direction thereof when the throttle valve 5 is in the first position, and the clearance increases, with the increase in the angle of rotation of the throttle valve 5 from the first position, when the throttle valve 5 is rotated in the counterclockwise direction from the first position. Hereinafter, the clearance thus formed at a spacing between the first external circular edge portion 5*a* of the throttle valve 5 and the upstream-side spherical wall surface 8 will be termed as a first clearance 13, while a clearance formed at a spacing between the second external circular edge portion 5*b* of the throttle valve 5 and the downstream-side spherical wall surface 9 will be termed as a second clearance 14. The second clearance 14 is formed larger than the first clearance 13 in a position where at least the throttle valve 5 reaches the low-speed and medium-speed ranges of the internal combustion engine, especially the low-speed range.

In the embodiment shown in FIG. 1, the constitution for forming the first clearance 13 and the second clearance 14 is shown as follows. That is, the throttle valve 5 formed in the circular plate is supported on the body member 1 by means of the throttle shaft 6, and rotates around a central axis 10 of rotation which is coinceded with one diameter of the throttle valve 5. The central axis 10 of rotation intersects the central axis X—X of the cylindrical inner wall 7 of the air passage 4. The upstream-side spherical wall surface 8 is made in a form of a spherical surface having a radius R1 with its center placed at the point 11 which is located on the central axis X—X and apart from the central axis 10 of rotation by a distance L1 to the upstream side. Also the downstream-side spherical wall surface 9 is made in a form of a spherical surface having a radius R2 with its center placed on the point 12 which is located on the central axis X—X and apart from the central axis 10 of rotation by a distance L2 on the downstream side.

The radius R1 of the upstream-side spherical wall surface 8 and the radius R2 of the downstream-side spherical wall surface 9 are equal ($R1=R2$), and the distance L2 between the central axis 10 of rotation on the central axis X—X and the center 12 of the spherical surface of the downstream-side spherical wall surface 9 is larger than the distance L1 between the center 11 of the spherical surface of the upstream-side spherical wall surface 8 and the central axis 10 of rotation ($L2>L1$).

In the intake control device of the above constitution, when the throttle valve 5 indicated by a solid line in FIG. 1 is rotated in the counterclockwise direction from the illustrated first position where the air passage 4 is closed, a clearance H2 in the radial direction of the throttle valve 5 between the second external circular edge portion 5*b* of the throttle valve 5 which rotates towards the downstream side and the spherical surface of the downstream-side spherical wall surface 9 increases at a larger rate than a clearance H1 in the radial direction of the throttle valve 5 between the first external circular edge portion 5*a* of the throttle valve 5 which rotates toward the upstream side and the spherical surface of the upstream-side spherical wall surface 8 since the distance L2 between the center 12 of the spherical surface of the downstream-side spherical wall surface 9 and the central axis 10 of rotation is larger than the distance L1 between the center 11 of spherical surface of the upstream-side spherical wall surface 8 and the central axis 10 of rotation. Accordingly, in a position of the throttle valve 5 during the operation of the internal combustion engine within a low-speed range, for example, a position as indicated by a dot-and-dash line in FIG. 1, the clearance H2 between the second external circular edge portion 5*b* and the downstream-side spherical wall surface 9 at the second clearance 14 is larger than the clearance H1 between the first external circular edge portion 5*a* and the upstream-side spherical wall surface 8 at the first clearance 13. Accordingly, at a time when a high intake manifold vacuum is built on the downstream side of the throttle valve 5 when the throttle valve 5 is in the position indicated by the dot-and-dash line, and the throttle shaft 5 is subjected to move to downstream side of the air passage 4 as a result of deflection of the throttle shaft 6 and/or looseness of the pedestal supporting the throttle shaft 6, the second outer peripheral portion 5*b* of the throttle valve 5 will not come into contact with the downstream-side spherical wall surface 9, and accordingly will not impede smooth operation of the internal combustion engine.

When the throttle valve 5 is in the first position where the air passage 4 is closed, it is desirable for idling operation of the internal combustion engine to provide a clearance of at least 0.05 mm between the upstream-side spherical wall surface 8 and the first external circular edge portion 5*a* of the throttle valve 5, that is said first clearance 13 and a clearance at least 0.1 mm, that is said second clearance 14, between the downstream-side spherical wall surface 9 and the second external circular edge portion 5*b* of the throttle valve 5.

Figure 2:
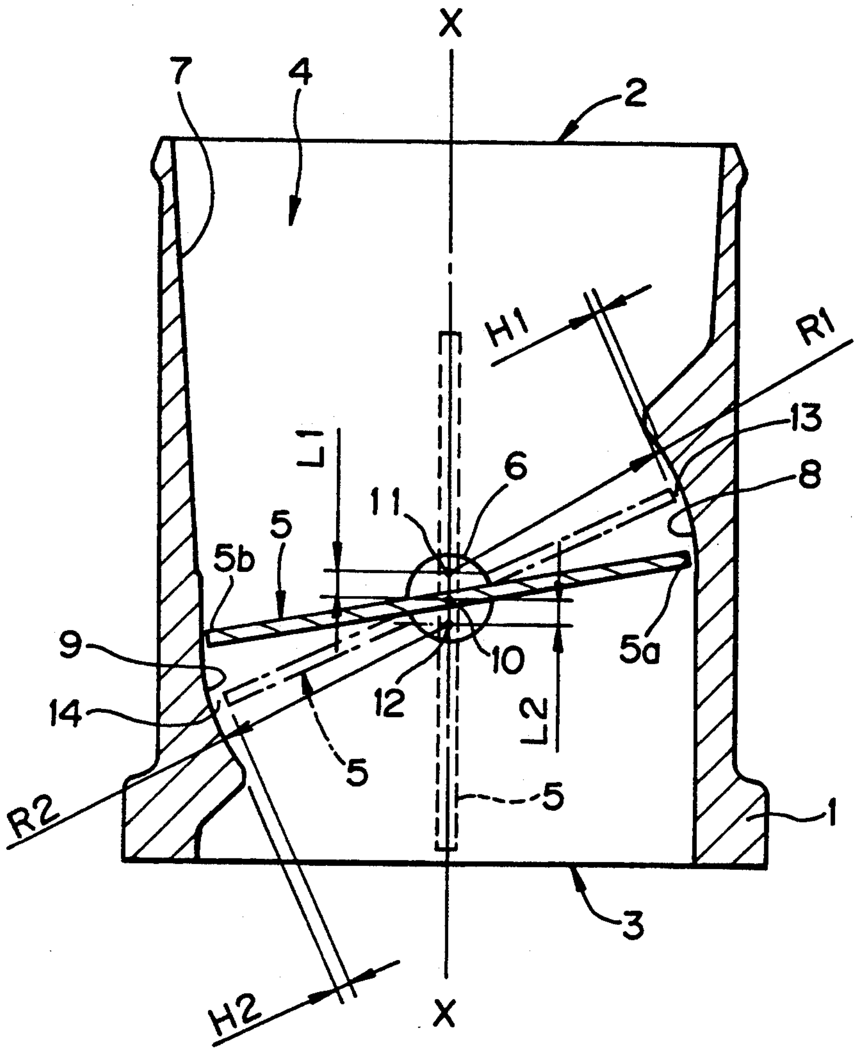
FIG. 2 is a sectional view of another embodiment of the intake control device according to the present invention.
Figure 3:
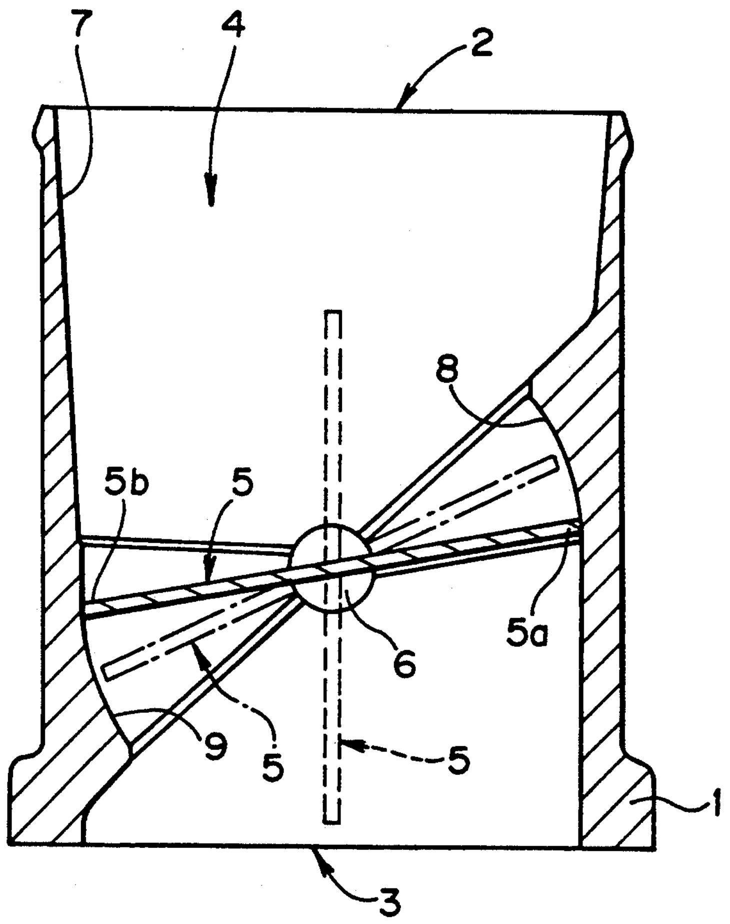
FIG. 3 PRIOR ART
FIG. 3 is a sectional view of a prior-art throttle body.

FIG. 2 shows another embodiment of the intake control device for the internal combustion engine according to the present invention in form of a throttle body having the similar configuration thereof as shown in FIG. 1. It should be noted that, in FIG. 2, the same members as those in FIG. 1 are designated by the same reference numerals, and explanations thereof are omitted. In FIG. 2, the upstream-side spherical wall surface 8 and the downstream-side spherical wall surface 9 are shown merely in section likewise in FIG. 1.

In FIG. 2, a distance L1 provided between the central axis 10 of rotation of the throttle valve 5 on the central axis X—X of the cylindrical inner wall 7 of the air passage 4 and the center 11 of the spherical surface of the upstream-side spherical wall surface 8 is equal to a distance L2 ($L1=L2$) provided between the central axis 10 of rotation and the center 12 of the spherical surface of the downstream-side spherical wall surface 9, and a radius R2 of the spherical surface of the downstream-side spherical wall surface 9 is larger than a radius R1 (R2>R1) of the spherical surface of the upstream-side spherical wall surface 8. A difference between the radii R1 and R2 of the spherical surfaces described above is to be slightly larger than the minimum value of the second clearance L2.

According to the intake control device of the above-described constitution, when the throttle valve 5 indicated by a solid line in FIG. 2 is rotated in the counter-clockwise direction from the first position illustrated in which the air passage 4 is closed, the clearance H2 in the radial direction of the throttle valve 5 between the second external circular edge portion 5b of the throttle valve 5 which rotates toward the downstream side and the spherical surface of the downstream-side spherical wall surface 9 increases at a larger rate than the clearance H1 in the radial direction of the throttle valve 5 between the first external circular edge part 5a of the throttle valve 5 which rotates toward the upstream side and the spherical surface of the upstream-side spherical wall surface 8 since the radius R2 of the spherical surface of the downstream-side spherical wall surface 9 is larger than the radius R1 of the spherical surface of the upstream-side spherical wall surface 8. Accordingly, in a position of the throttle valve 5 during the operation of the internal combustion engine within the low-speed range, for example, a position as indicated by a dot-and-dash line in FIG. 2, the clearance H2 between the second external circular edge portion 5b and the downstream-side spherical wall surface 9 at the clearance 14 is larger than the clearance H1 between the first external circular edge part 5a and the upstream-side spherical wall surface 8 at the clearance 13. Therefore, when the throttle valve 5 is in the position indicated by the dot-and-dash line, the second external circular edge portion 5b of the throttle valve 5 will not come into contact with the downstream-side spherical wall surface 9 at a time when a high intake manifold vacuume is built on the downstream side of the throttle valve 5, assuring smooth operation of the internal combustion engine.

In the description with respect to FIGS. 1 and 2, it has been explained that the upstream-side spherical wall surface 8 and the downstream-side spherical wall surface 9 which are formed spherical. It should be noted that these explanations are for assistance in understanding that the second clearance 14 produced between the second external circular edge portion 5b of the throttle valve 5 and the downstream-side spherical wall surface 9 is always larger than the first clearance 13 produced between the first external circular edge portion 5a of the throttle valve 5 and the upstream-side spherical wall surface 8 upon the rotation of the throttle valve 5. It should be noted that, in the present invention, the shape of the upstream-side spherical wall surface 8 and the downstream-side spherical wall surface 9 are not limited to the spherical surfaces. That is, it is manifest that, in the low-speed and medium-speed ranges of the internal combustion engine, concave surfaces can be substituted for the upstream-side spherical wall surface 8 and downstream-side spherical wall surface 9 in which clearances between the concave surfaces and the first external circular edge portion 5a and the second external circular edge portion 5b, respectively, increase in proportion to the angle of rotation of the throttle valve 5 from the first position in which the air passage 4 is closed, and the spacing of the second clearance 14 is always held larger than the first clearance 13. Consequently, a concave surface which is formed by the rotation of an elliptical curve or an oblong curve can be substituted for the upstream-side spherical wall surface 8 and/or the downstream-side spherical wall surface 9 with itself or with combination with a spherical surface.

According to the present invention, the second clearance formed between the second external circular edge portion of the throttle valve and the downstream-side spherical wall surface formed in the inner wall defining the air passage is larger than the first clearance formed between the first external circular edge portion of the throttle valve and the upstream-side spherical wall surface formed in the inner wall; therefore, the second external circular edge portion will not come into contact with the downstream-side spherical wall surface even when a high intake manifold vacuum has been built in the air passage downstream of the throttle valve, thus assuring smooth operation of the internal combustion engine.

What is claimed is:

1. An intake control device for an internal combustion engine, comprising a body member formed in a cylindrical form and having an air inlet opening on an upstream side thereof and an air outlet opening on a downstream side thereof and an air passage connecting said air inlet opening with said air outlet opening;

a plate-like throttle valve disposed within said air passage of said body member, rotatably supported by a throttle shaft on said body member for rotating between a first position in which said air passage is closed and a second position in which said air passage is fully opened, and having a first external circular edge portion which is moved toward the upstream side from said first position and a second external circular edge portion which is moved toward the downstream side from said first position; and two spherical wall surfaces including an upstream-side spherical wall surface and a downstream-side spherical wall surface protrusively provided on the inner wall surface defining said air passage of said body member, respectively, in which said upstream-side spherical wall surface is formed in a position where said first external circular edge portion faces during rotation of said throttle valve within a range corresponding to a predetermined angle from said first position, and said downstream-side spherical wall surface is formed in a position where said second external circular edge portion faces during rotation of said throttle valve within the range corresponding to said predetermined angle from said first position; characterized in that said upstream-side spherical wall surface and said downstream-side spherical wall surface formed in said body member are formed in such spherical surfaces that a first clearance formed between said upstream-side spherical wall surface and said first external circular edge portion of said throttle valve and a second clearance formed between said downstream spherical wall surface and said second external circular edge portion of said throttle valve increase with an increase in an angle of rotation of said throttle valve from said first position toward said second position; and said second clearance is larger than said first clearance at least in the vicinity of said first position of said throttle valve.

2. An intake control device for an internal combustion engine according to claim 1, wherein said throttle shaft has a central axis of rotation intersecting a central axis of said air passage of said body member; said upstream-side spherical wall surface is made in a form of spherical surface having its center at a point off on the upstream side above the central axis of rotation of said throttle shaft on the central axis of said air passage; and said downstream-side spherical wall surface is made in a form of spherical surface having its center at a point off on the downstream side below the central axis of rotation of said throttle shaft on the central axis of said air passage.

3. An intake control device for an internal combustion engine according to claim 2, wherein the radius of the spherical surface of said upstream-side spherical wall surface is equal to the radius of the spherical surface of said downstream-side spherical wall surface; and a distance along the central axis of said air passage between the center of the spherical surface of said upstream-side spherical wall surface and the central axis of rotation of said throttle shaft is less than a distance along the central axis of said air passage between the center of the spherical surface of said downstream-side spherical wall surface and the central axis of rotation of said throttle shaft.

4. An intake control device for an internal combustion engine according to claim 2, wherein the radius of the spherical surface of said upstream-side spherical wall surface is smaller than the radius of the spherical surface of said downstream-side spherical wall surface, and a distance along the central axis of said air passage between the center of the spherical surface of said upstream-side spherical wall surface and the central axis of rotation of said throttle shaft is equal to a distance along the central axis of said air passage between the center of said downstream-side spherical wall surface and the central axis of rotation of said throttle shaft.

* * * * *